(12) United States Patent
Huang

(10) Patent No.: US 7,191,692 B2
(45) Date of Patent: Mar. 20, 2007

(54) TABLE SAW

(75) Inventor: Peter Huang, Taichung (TW)

(73) Assignee: Durq Machinery Corp. (TW)

( * ) Notice: Subject to any disclaimer, the term of this patent is extended or adjusted under 35 U.S.C. 154(b) by 342 days.

(21) Appl. No.: 10/893,368

(22) Filed: Jul. 19, 2004

(65) Prior Publication Data

US 2005/0204883 A1    Sep. 22, 2005

(30) Foreign Application Priority Data

Mar. 22, 2004  (TW) .............................. 93204345 U

(51) Int. Cl.
  *B25H 1/14*  (2006.01)
  *B26D 7/06*  (2006.01)
  *B26D 7/27*  (2006.01)
(52) U.S. Cl. .................... 83/468; 83/428; 83/477.2; 83/522.17; 83/522.19; 144/287
(58) Field of Classification Search ................ 83/438, 83/446, 552.15–522.25, 468; 33/296, 430, 33/434, 436, 464, 628, 630, 633, 640, 641, 33/809; 144/287
See application file for complete search history.

(56) References Cited

U.S. PATENT DOCUMENTS

| 1,488,482 A | * | 4/1924 | Eckman ....................... 33/418 |
| 6,148,703 A | * | 11/2000 | Ceroll et al. .................. 83/13 |
| 6,786,122 B2 | * | 9/2004 | Svetlik ........................ 83/468 |

* cited by examiner

*Primary Examiner*—Kenneth E. Peterson
*Assistant Examiner*—Edward Landrum
(74) *Attorney, Agent, or Firm*—Bacon & Thomas PLLC

(57) ABSTRACT

A table saw includes a primary table having an opening through which a saw blade extends, and an auxiliary table slidably coupled to the primary table at one side. A fence is movable on the primary table and the auxiliary table relative to the saw blade. A first scale is provided on the primary table and exposed to the outside. A first index is provided at the fence for indicating readings of the first scale. A second scale is kept from sight when the auxiliary table is abutted against the primary table and exposed to the outside for reading by a second index when the auxiliary table is pulled outwards from the table.

4 Claims, 9 Drawing Sheets

TABLE SAW

BACKGROUND OF THE INVENTION

1. Field of the Invention

The present invention relates to a sawing machine and more particularly, to a table saw, which has a simple structure of scale system for easy reading.

2. Description of the Related Art

FIG. 1 is a top view of a table saw according to the prior art. According to this design, the table saw comprises a primary table 1, an auxiliary table 2, a saw blade 3, a fence 4, a scale system 5, and an index system 6. The auxiliary table 2 is movable relative to the primary table 1 by means of two parallel guiding bars 7. The fence 4 is movable on the primary table 1 and the auxiliary table 2 relative to the saw blade 3. The scale system 5 comprises a first scale 5a and a second scale 5b longitudinally provided at one guide bar 7 at different elevations. The index system 6 comprises a first index 6a provided at the fence 4, and a second index 6b provided at the primary table 1. When the auxiliary table 2 is set close to one side of the primary table 1, the user can know the distance between the fence 4 and the saw blade 3 by reading the reading on the first scale 5a indicated by the first index 6a. When the fence 4 is locked to the auxiliary table 2 and pulled outwards with the auxiliary table 2 relative to the primary table 1, the user can know the distance between the fence 4 and the saw blade 3 by reading the reading on the second scale 5b indicated by the second index 6b.

The aforesaid scale system 5 and index system 6 enable the user to judge the distance between the fence 4 and the saw blade 3. However, because the first scale 5a and the second scale 5b are arranged adjacent to each other at different elevations, a reading error may occur, i.e., the user may read the reading on the wrong scale when measuring the distance between the fence 4 and the saw blade 3.

Therefore, it is desirable to provide a table saw that eliminates the aforesaid problem.

SUMMARY OF THE INVENTION

The present invention has been accomplished under the circumstances in view. It is the primary objective of the present invention to provide a table saw, which has a simple structure of scale system for easy reading.

It is another objective of the present invention to provide a table saw, which keeps the second scale for measuring the distance between the fence and the saw blade from sight when the fence is set in the received status.

To achieve these objectives of the present invention, the table saw comprises a saw base, a primary table supported on the saw base, an auxiliary table, a fence, a scale system, and an index system. The primary table has a top surface and an opening through which a saw blade extends. The auxiliary table is movable along a path relative to the primary table between a received position where the auxiliary table abuts against the primary table and an extended position where the auxiliary table is spaced from the primary table. The auxiliary table has a top surface. The fence is movable on the top surfaces of the primary and auxiliary tables relative to the saw blade. The scale system includes a first scale and a second scale. The first scale has a start point, an end point, and readings increasing in value in a direction from the start point toward the end point. The second scale has a start point, an end point, and readings increasing in value in a direction from the start point of the second scale toward the end point of the second scale. The value of the start point of the second scale is equal to that of the end point of the first scale. The index system includes a first index for indicating the readings at the first scale, and a second index for indicating the readings at the second scale. The first index is provided at the fence. The auxiliary table comprises a sliding track extended in parallel to the path. The first scale is provided at the sliding track and the second index is provided at the sliding track. The primary table comprises a guiding rail arranged in parallel to the sliding track of the auxiliary table. The second scale is provided at the guiding rail. The increasing direction of the readings of the second scale in value is same as the increasing direction of the readings of the first scale in value.

DETAILED DESCRIPTION OF THE INVENTION

Figure 2:
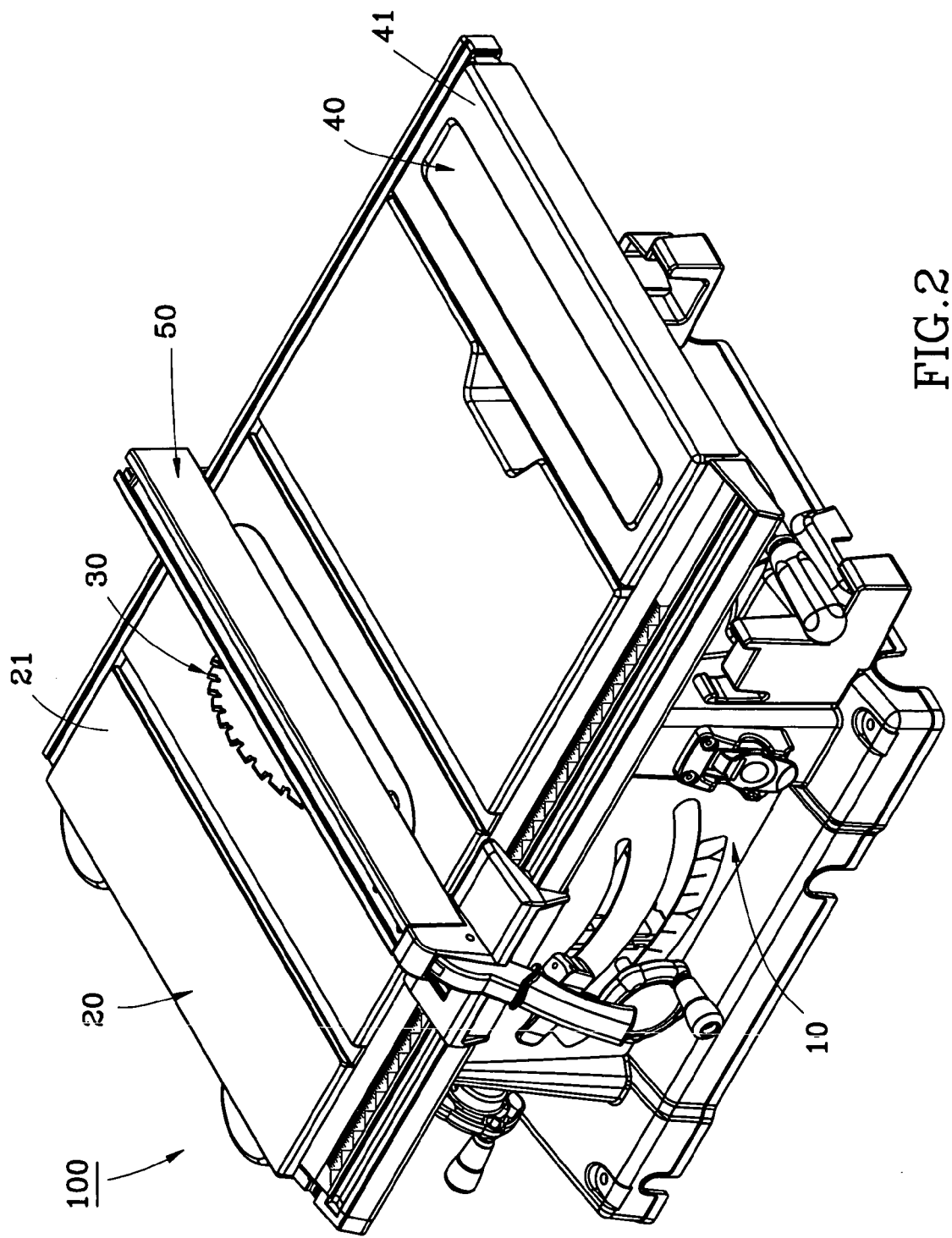
FIG. 2 is a perspective view of a table saw according to a preferred embodiment of the present invention.
Figure 3:
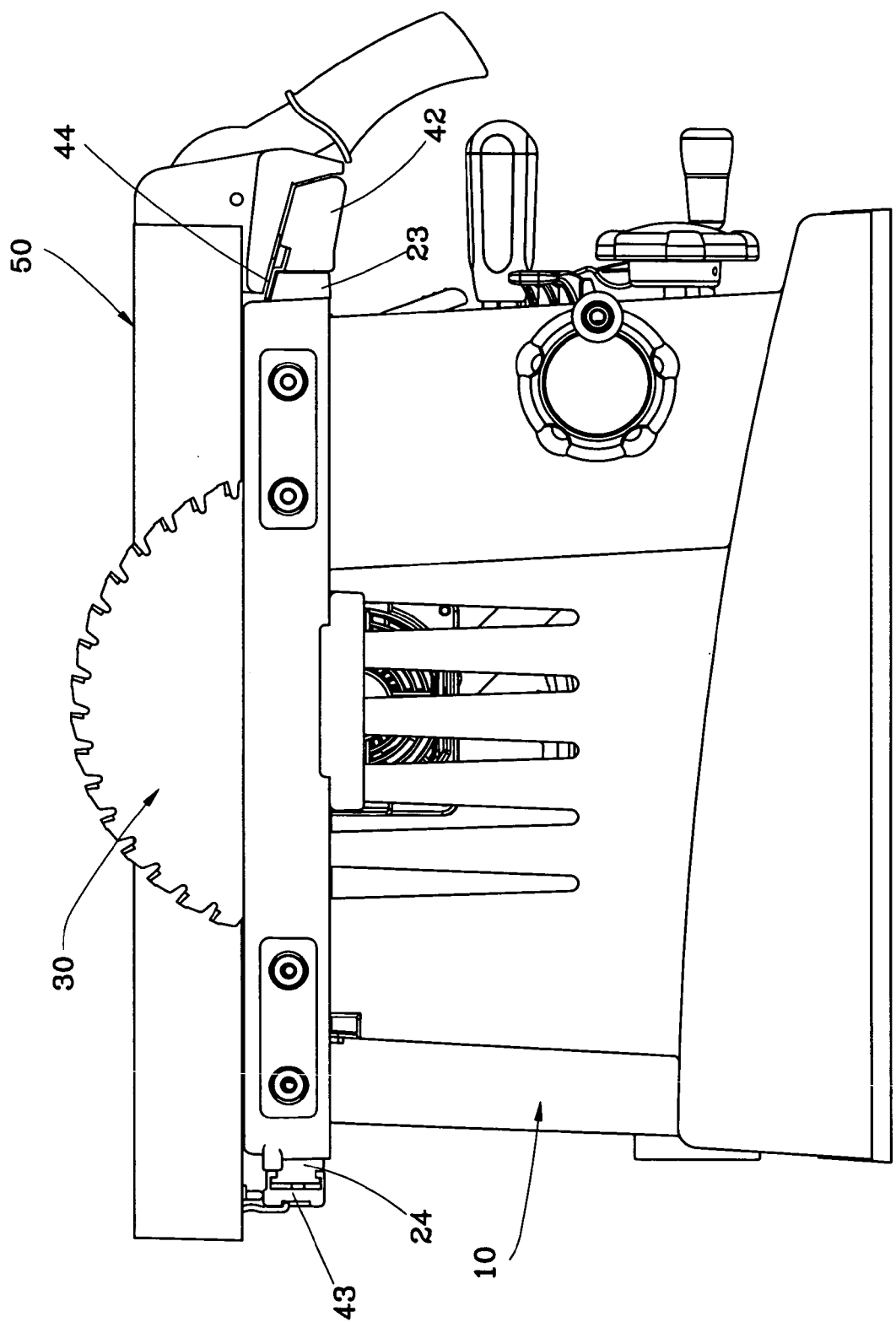
FIG. 3 is a side view of the table saw according to the preferred embodiment of the present invention.
Figure 4:
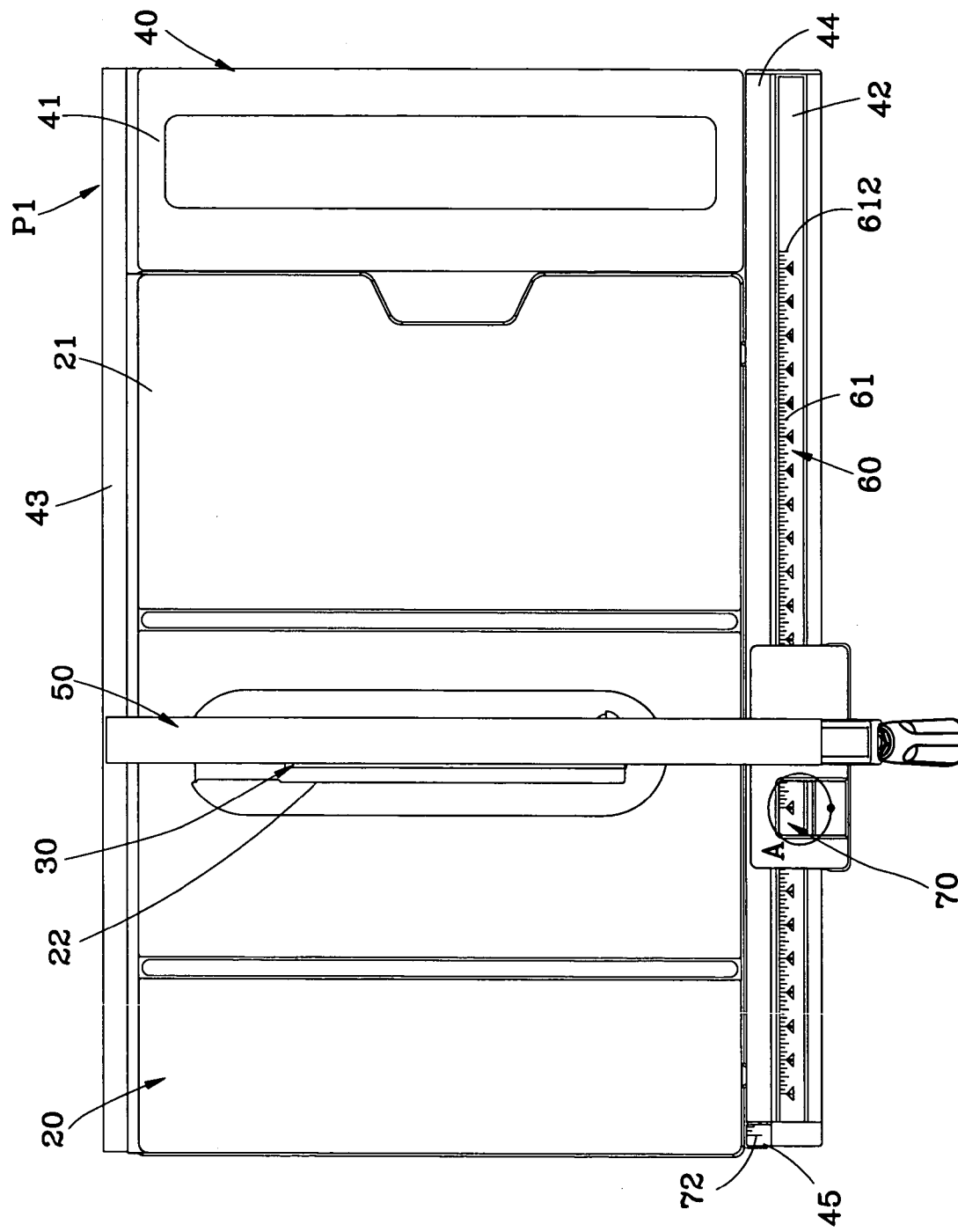
FIG. 4 is a top view of the preferred embodiment of the present invention, showing the received status of the auxiliary table of the table saw.

Referring to FIGS. 2–4, a table saw 100 provided by the preferred embodiment of the invention is shown comprised of a saw base 10, a primary table 20, a saw blade 30, an auxiliary table 40, a fence 50, a scale system 60, and an index system 70.

The primary table 20 is fixedly supported on the saw base 10, having a top surface 21 and an opening 22 through which the saw blade 30 that is rotatably actuated by a motor (not shown) that is installed inside the saw base 10 extends.

Figure 5:
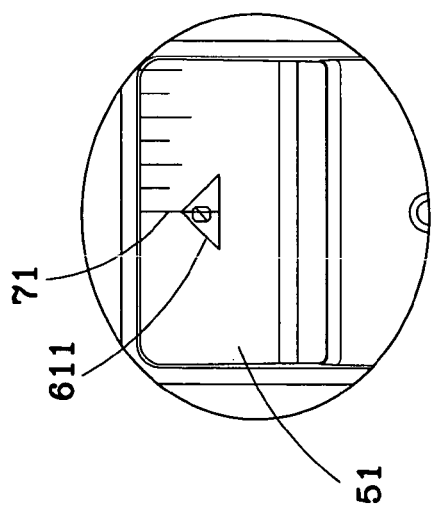
FIG. 5 is an enlarged view of part A of FIG. 4.

The auxiliary table 40 has a top surface 41. The fence 50 is movable on the top surface 21 of the primary table 20 and the top surface 41 of the auxiliary table 40 relative to the saw blade 30. The fence 50 is provided with a transparent window 51 as shown in FIG. 5.

The above-mentioned elements are similar to those of the conventional table saw. Accordingly, the structural relationships between the above-mentioned elements are described hereinafter no more. The main feature of the present invention is outlined as follows.

Figure 9:
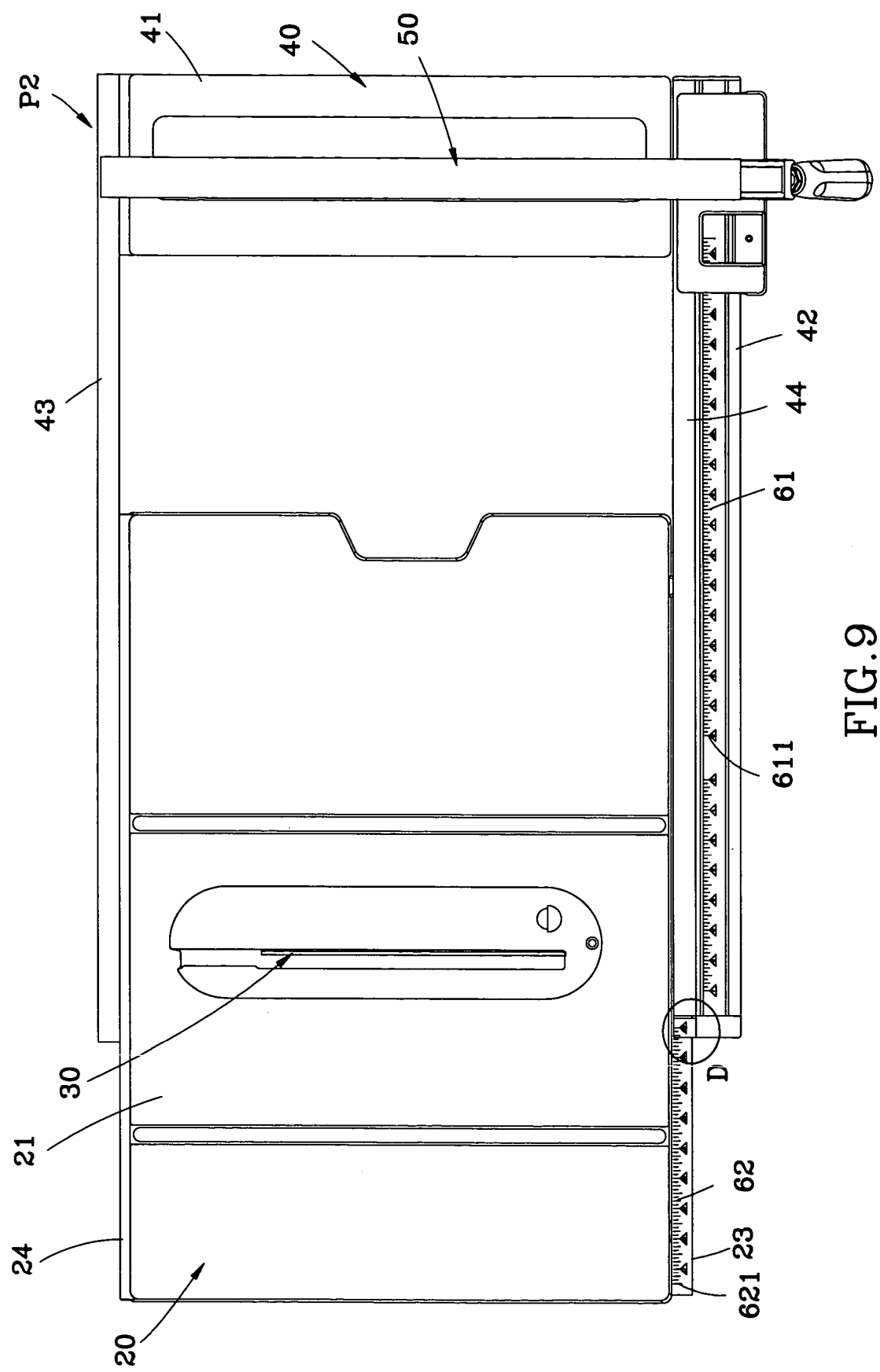
FIG. 9 is similar to FIG. 6 but showing that the fence is mounted on the auxiliary table and the auxiliary table is moved outwards from the primary table to an extended position.

Referring to FIGS. 3, 4 and 9, the primary table 20 comprises a first guiding rail 23 and a second guiding rail 24 respectively extended along the front and rear sides below the elevation of the top surface 21. The auxiliary table 40 comprises a first sliding track 42 and a second sliding track 43 respectively fixedly provided at the front and rear sides and respectively coupled to the first guiding rail 23 and second guiding rail 24 of the primary table 20 for enabling the auxiliary table 40 to be moved relative to the primary table 20 between a received position P1 (see FIG. 4) and an extended position P2 (see FIG. 9). The length of the sliding tracks 42, 43 is approximately equal to the combined length of the length of the front side of the primary table 20 and the length of the front side of the auxiliary table 40. Further, a guard flange 44 is formed integral and extended from the top side of the first sliding track 42 above the first guiding rail 23. A transparent block 45 is provided at a distal end of the first sliding track 42.

The scale system 60 comprises a first scale 61 longitudinally provided at the first sliding track 42, and a second scale 62 longitudinally provided at the first guiding rail 23. The first scale 61 has a true-zero start point 611 (see FIG. 5) and an end point 612. The reading of the end point 612 of the first scale 61 is "16½". The end point 612 of the first scale 61 is disposed adjacent to one end of the auxiliary table 40. The increasing direction of the readings of the second scale 62 in value is same as that of the first scale 61. The second scale 62 has a start point 621 which reading is equal to the reading of the end point 612 of the first scale 61, and an end point 622. The reading of the end point 622 of the second scale 62 is 25 (see FIG. 10). The start point 621 of the second scale 62 is disposed adjacent to one end of the primary table 20 remote from the auxiliary table 40. The readings of the scales 61, 62 are based on the unit of inch.

Figure 7:
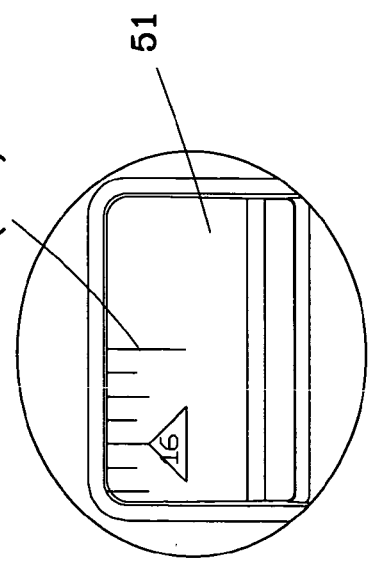
FIG. 7 is an enlarged view of part B of FIG. 6.

The index system 70 comprises a first index 71 marked on the transparent window 51 of the fence 50, and a second index 72 marked on the transparent block 45 of the first sliding track 42. When the auxiliary table 40 is set in the received position P1, the fence 50 can be moved on the top surface 21 of the primary table 20 and the top surface 41 of the auxiliary table 40. When moved the fence 50 to the saw blade 30 at this time, as shown in FIG. 4, the distance between the fence 50 and the saw blade 30 is zero, and the reading indicated by the first index 71 is zero (see FIG. 5). If the user moves the fence 50 to the top surface 41 of the auxiliary table 40 as shown in FIG. 6, the first index 71 is aimed at the end point 612 of the first scale 61, indicating the distance between the fence 50 and the saw blade 30 to be 16.5 inches as shown in FIG. 7.

Figure 8:
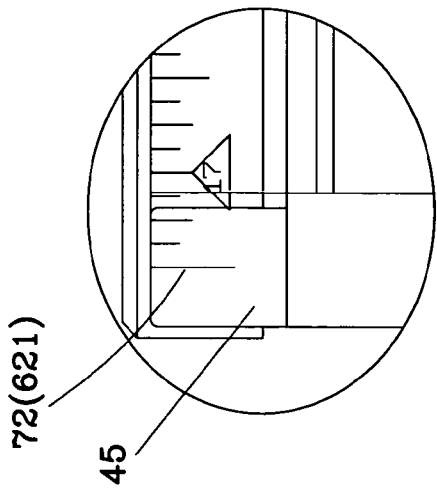
FIG. 8 is an enlarged view of part C of FIG. 6.
Figure 6:
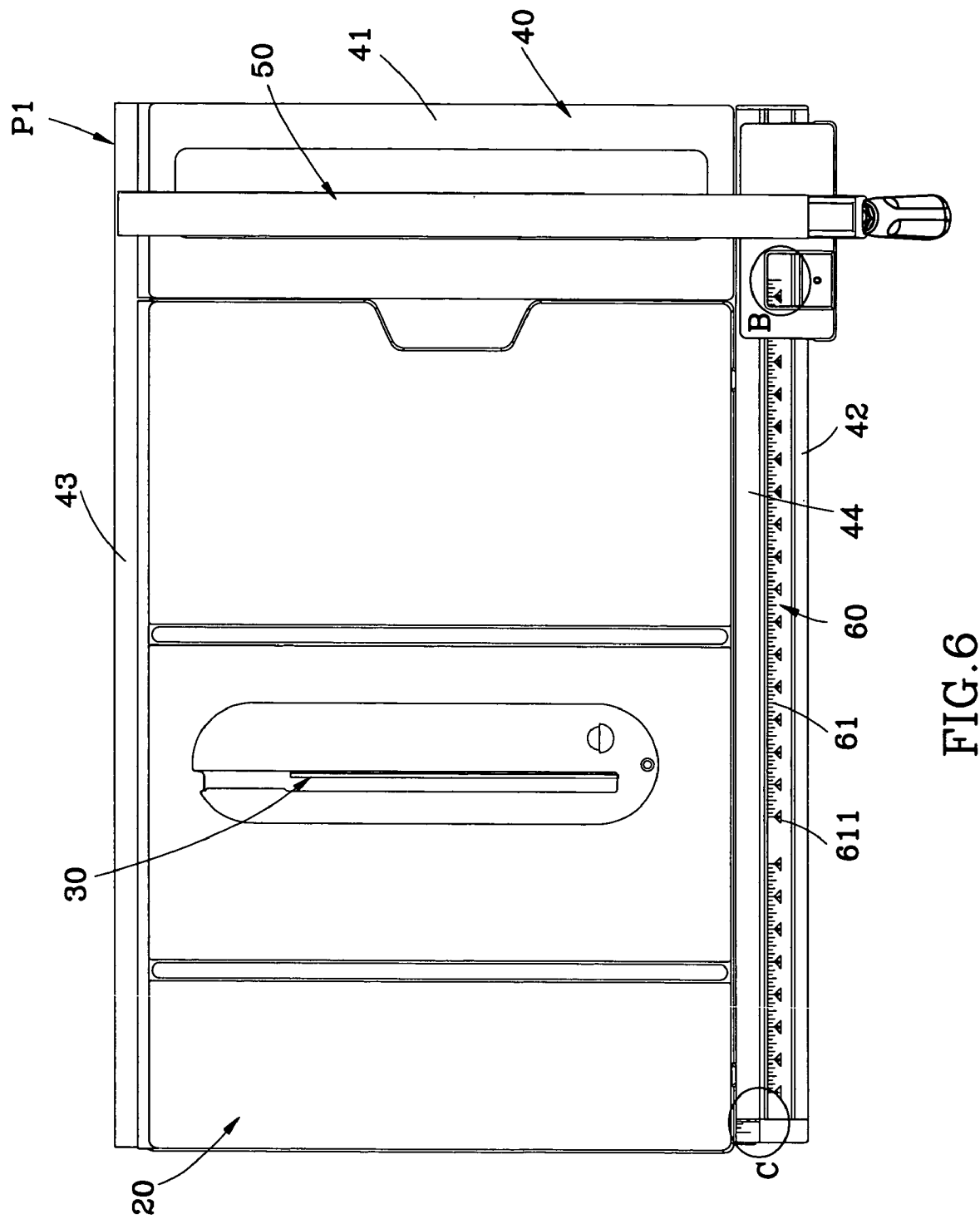
FIG. 6 is similar to FIG. 4 but showing the fence mounted on the auxiliary table.

Further, when in the condition shown in FIG. 4 or 6 where the auxiliary table 40 is set in the received position P1, the second index 72 is kept aimed at the start point 621 of the second scale 62 as shown in FIG. 8; however, the guard flange 44 keeps the other readings of the second scale 62 from sight.

Figure 10:
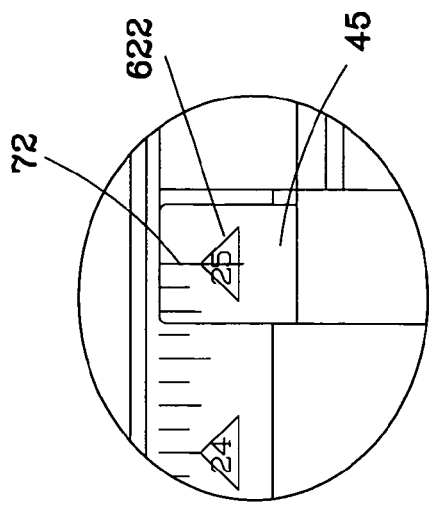
FIG. 10 is an enlarged view of part D of FIG. 9.

FIG. 9 shows the fence 50 moved with the auxiliary table 40 to an extended position P2. Because the first and second sliding tracks 42, 43 were moved with the auxiliary table 40 relative to the primary table 20, the indication of the second index 72 at the second scale 62 is relatively changed. As illustrated in FIG. 10, the second index 72 indicates the reading of the maximum distance between the fence 50 and the saw blade 30 to be 25 inches.

As indicated above, the user can easily know the actual distance between the fence 50 and the saw blade 30 by means of the indication of the first index 71 at the first scale 61 if the length of the workpiece to be cut is shorter than or equal to 16.5 inches, and the presence of the second scale 62 does not interfere with the user's sight in reading the indication of the first index 71 at the first scale 61.

Figure 11:
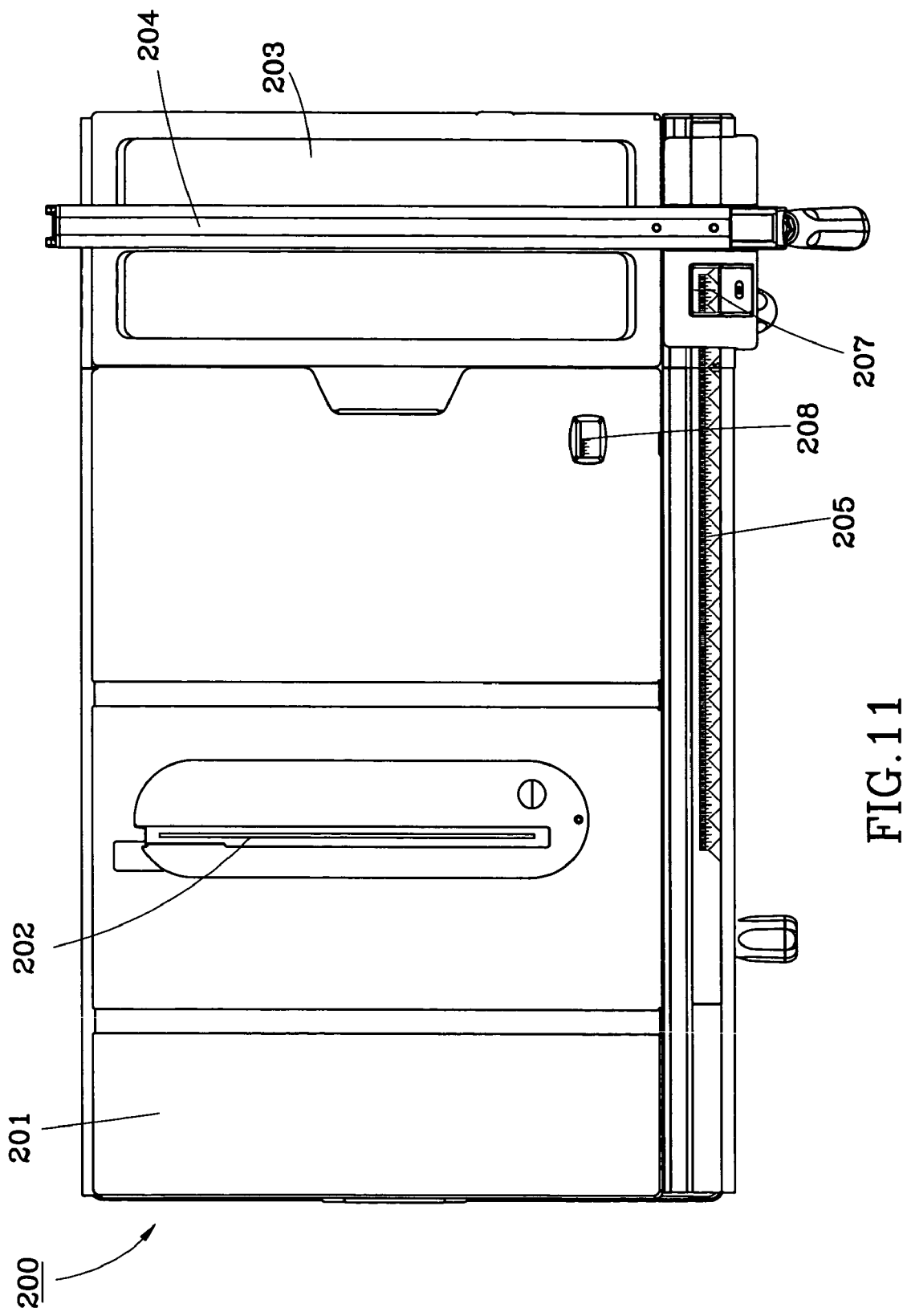
FIG. 11 is a top view of another preferred embodiment of the present invention showing the received status of the auxiliary table of the table saw.
Figure 12:
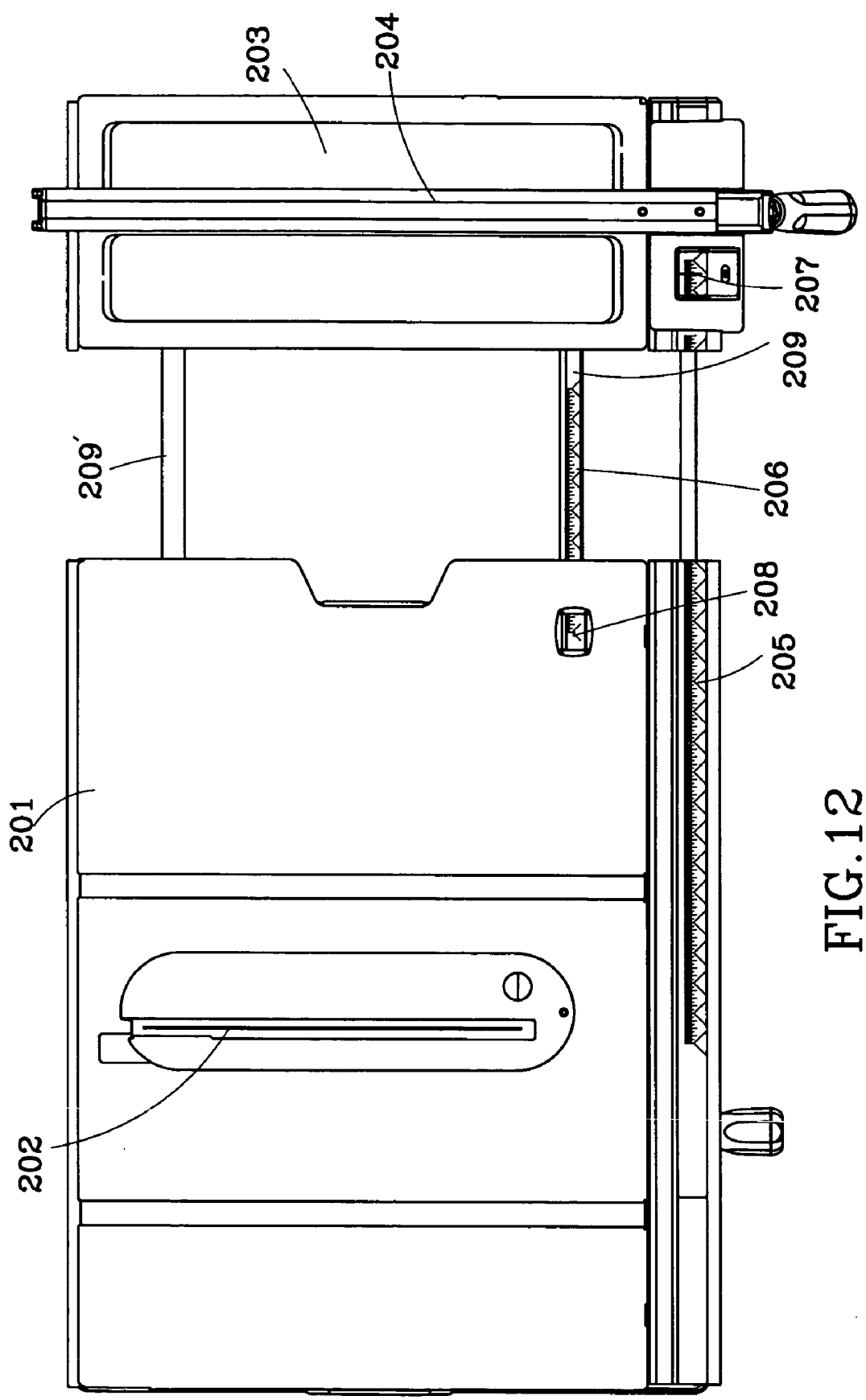
FIG. 12 is similar to FIG. 11 but showing the auxiliary table moved outwards from the primary table to an extended position.

FIGS. 11 and 12 show another preferred embodiment of the table saw according to the present invention. According to this embodiment, the table saw 200 comprises a primary table 201, a saw blade 202, an auxiliary table 203, a fence 204, a first scale 205, a second scale 206, a first index 207, and a second index 208. The main feature of this embodiment is outlined hereinafter.

Figure 1:
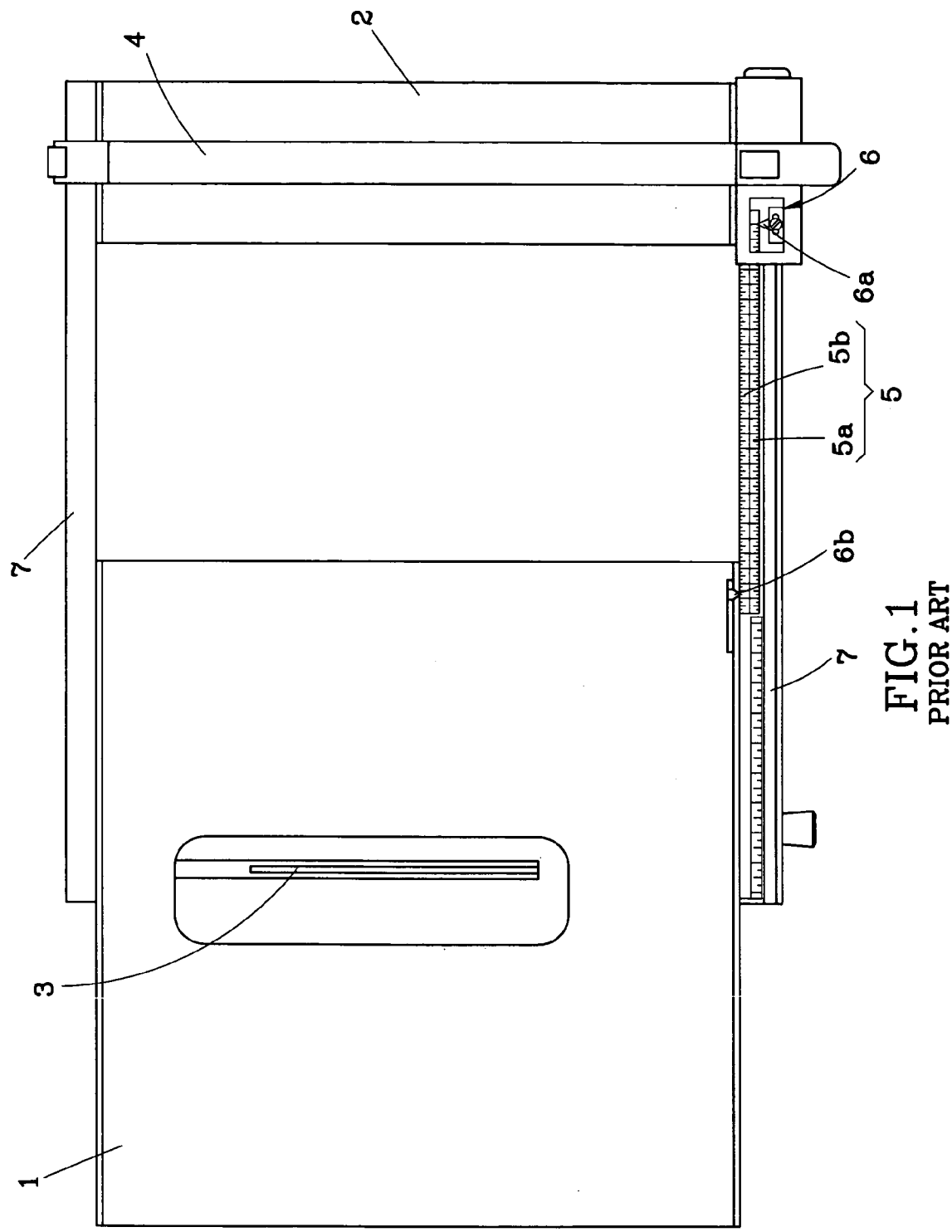
FIG. 1 is a schematic top view of a table saw according to the prior art.

The auxiliary table 203 comprises two parallel rails 209, 209', which are slidably coupled to the primary table 201 for enabling the auxiliary table 203 to be moved relative to the primary table 201. The first scale 205 is fixedly provided at one side of the primary table 201. The second scale 206 is provided at the rail 209 of the auxiliary table 203. It is to be noted that the increasing direction of the readings of the second scale 206 in value is reversed to the increasing direction of the readings of the first scale 205 in value. In other words, the values of the readings of the first scale 205 are gradually increased from the left end of the first scale 205 toward the right end of the first scale 205; however, the values of the readings of the second scale 206 are gradually increased from the right end of the second scale 206 toward the left end of the second scale 206. When the auxiliary table 203 is set in the received position as shown in FIG. 1, the user can read the reading of the first scale 205 indicated by the first index 207 that is provided at the fence 204. When the auxiliary table 203 is set in an extended position as shown in FIG. 12, the user can read the reading of the second scale 206 indicated by the second index 208 that is provided at a transparent window of the primary table 201. Similar to the aforesaid first embodiment of the present invention, the second scale 206 of the table saw 200 is kept from sight when the auxiliary table 203 is set in the received position. Therefore, the user can quickly read the accurate indication without confusion.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A table saw comprising:

a saw base;

a primary table supported on said saw base, said primary table having a top surface and an opening through which a saw blade extends;

an auxiliary table movable along a path relative to said primary table between a received position where said auxiliary table abuts against said primary table and an extended position where said auxiliary table is spaced from said primary table, said auxiliary table having a top surface;

a fence movable on said top surface of said primary table and said top surface of said auxiliary table relative to said saw blade;

a scale system having a first scale and a second scale, said first scale having a start point, an end point, and readings increasing in value in a direction from the start point toward the end point, said second scale having a start point, an end point, and readings increasing in value in a direction from the start point of said second scale toward the end point of said second scale, the value of the start point of said second scale being equal to that of the end point of said first scale; and an index system having a first index for indicating the readings at said first scale, and a second index for indicating the readings at said second scale;

wherein said first index is provided at said fence;

wherein said auxiliary table comprises a sliding track extended in parallel to said path;

wherein said first scale is provided at said sliding track and said second index is provided at said sliding track;

wherein said primary table comprises a guiding rail arranged in parallel to said sliding track of said auxiliary table;

wherein said second scale is provided at said guiding rail;

wherein the increasing direction of the readings of said second scale in value is same as the increasing direction of the readings of said first scale in value.

2. The table saw as claimed in claim 1, wherein the sliding track at which said first scale is provided comprises a guard flange disposed above the guiding rail at which said second scale is provided.

3. The table saw as claimed in claim 1, wherein the start point of said second scale is disposed at one side of said primary table; said second index is disposed at a distal end of the sliding track; said second index is aimed at the start point of said second scale when said auxiliary table is set in said received position.

4. The table saw as claimed in claim 1, wherein said sliding track has a length not greater than a combined length of a length of a front side of said primary table and a length of a front side of said auxiliary table.

* * * * *